(12) United States Patent
Hakim et al.

(10) Patent No.: US 9,667,860 B2
(45) Date of Patent: May 30, 2017

(54) PHOTO COMPOSITION AND POSITION GUIDANCE IN A CAMERA OR AUGMENTED REALITY SYSTEM

(71) Applicant: Google Inc., Mountain View, CA (US)

(72) Inventors: Kinan Hakim, Lubeck (DE); Ronald Frank Wotzlaw, Mountain View, CA (US)

(73) Assignee: Google Inc., Mountain View, CA (US)

( * ) Notice: Subject to any disclaimer, the term of this patent is extended or adjusted under 35 U.S.C. 154(b) by 39 days.

(21) Appl. No.: 14/259,126

(22) Filed: Apr. 22, 2014

(65) Prior Publication Data
US 2015/0229838 A1    Aug. 13, 2015

Related U.S. Application Data

(60) Provisional application No. 61/939,724, filed on Feb. 13, 2014.

(51) Int. Cl.
H04N 5/232         (2006.01)

(52) U.S. Cl.
CPC ..... H04N 5/23222 (2013.01); H04N 5/23293 (2013.01)

(58) Field of Classification Search
CPC .......... H04N 5/23222; H04N 5/23293; H04N 5/772; H04N 5/232
See application file for complete search history.

(56) References Cited

U.S. PATENT DOCUMENTS

| | | | | |
|---|---|---|---|---|
| 7,239,350 B2 * | 7/2007 | Ban | ................... | H04N 5/23222 348/231.3 |
| 7,317,485 B1 * | 1/2008 | Miyake | ................. | G03B 17/20 348/333.02 |
| 8,081,230 B2 * | 12/2011 | Jiang | ...................... | G03B 17/38 348/222.1 |
| 8,254,647 B1 | 8/2012 | Nechyba et al. | | |
| 2003/0086615 A1 | 5/2003 | Dance et al. | | |
| 2007/0058064 A1 * | 3/2007 | Hara | ................... | H04N 5/23293 348/333.01 |
| 2010/0214445 A1 * | 8/2010 | Chronqvist | ........ | H04N 1/00336 348/231.99 |
| 2013/0128090 A1 | 5/2013 | Choi | | |
| 2014/0132629 A1 * | 5/2014 | Pandey | ................ | G02B 27/017 345/633 |
| 2015/0098000 A1 | 4/2015 | Gosangi et al. | | |

OTHER PUBLICATIONS

International Searching Authority, "Notification of Transmittal of the International Search Report and the Written Opinion of the International Search Authority, or the Declaration," for International Application No. PCT/US2015/15963, mailed Jun. 12, 2015, 8 pages.

\* cited by examiner

*Primary Examiner* — Luong T Nguyen

(74) *Attorney, Agent, or Firm* — Lowenstein Sandler LLP

(57) ABSTRACT

A method, computer readable medium and an apparatus are presented for providing composition and position guidance for a camera. One method includes detecting an image received on a capturing device. The image is analyzed to identify objects and determine attributes of the objects. Suggestions are provided to adjust at least one of position or setting of the capturing device in accordance to rules, based on the analysis of the image. Adjustment of the capturing device based on the suggestions provided, are detected and used to receive an adjusted image. The adjusted image is captured by the capturing device.

20 Claims, 10 Drawing Sheets

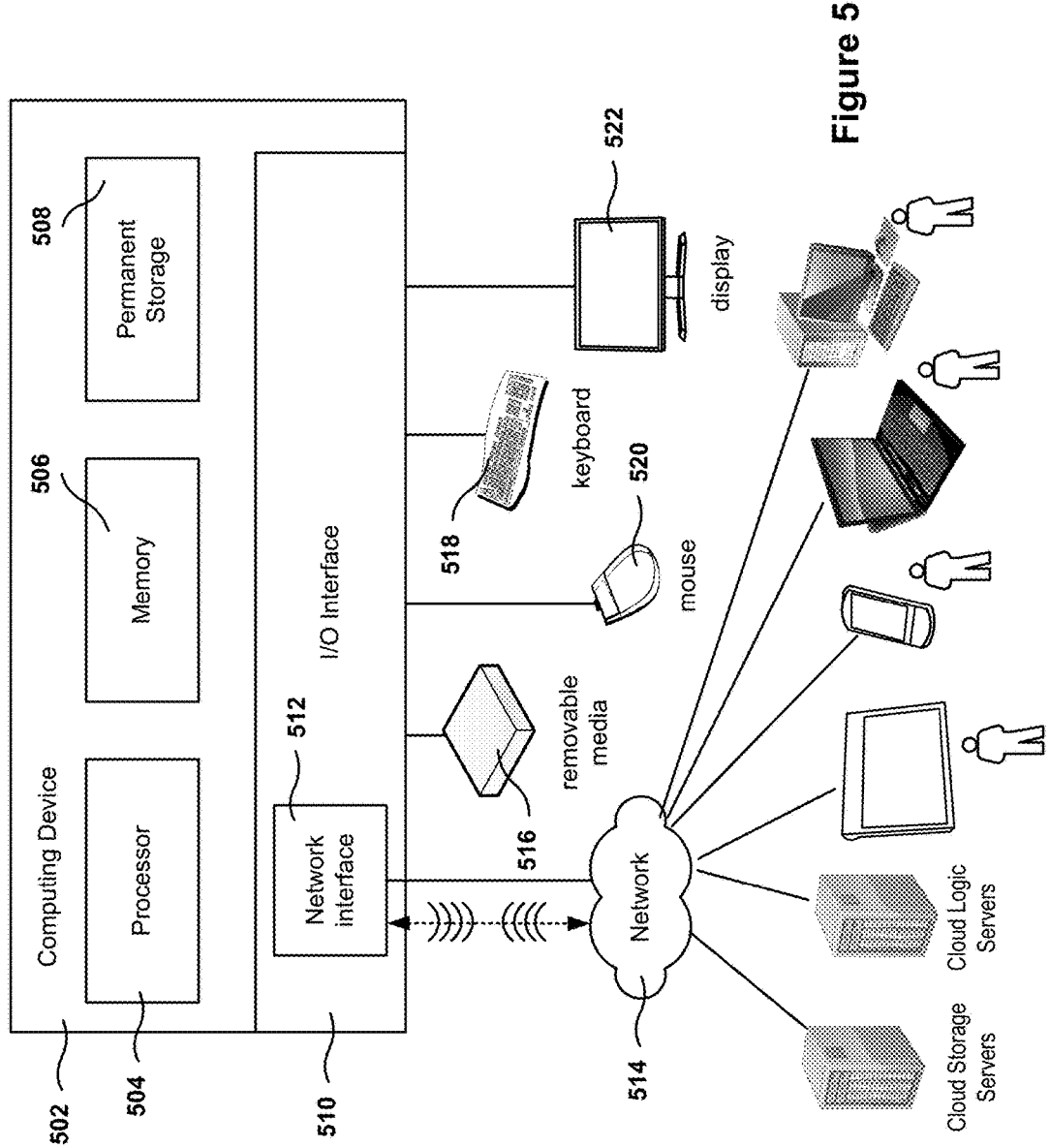

PHOTO COMPOSITION AND POSITION GUIDANCE IN A CAMERA OR AUGMENTED REALITY SYSTEM

CLAIM OF PRIORITY

This application claims priority from U.S. Provisional Patent Application No. 61/939,724, filed Feb. 13, 2014, and entitled "PHOTO COMPOSITION AND POSITION GUIDANCE IN A CAMERA OR AUGMENTED REALITY SYSTEM." This provisional application is herein incorporated by reference.

FIELD OF THE INVENTION

The present disclosure relates to methods, systems and computer programs for capturing images of optimal quality and composition.

BACKGROUND

Taking pictures and sharing them with friends has become an accepted norm in today's world of social communication. Various hand-held devices, such as mobile phones, eye glasses, etc., all come equipped with cameras that allow the users to take pictures of scenes, people, monuments, events, etc., and share them with their friends and family. Often times, when sightseeing or attending an important event, users sometimes end up with pictures that are non-optimal. For instance, the pictures of monuments (for e.g., cathedrals, churches, large buildings, etc.), people, events, sights, etc., may not be symmetrical, buildings may be skewed, objects may be out-of-focus, and in general, the captured pictures are not of good quality. It is not apparent to the users, especially amateur or in-experienced users of cameras, when taking pictures, of how the pictures will turn out or the poor quality of the pictures till the users try to view the pictures later.

It is in this context that embodiments of the invention arise.

SUMMARY

Embodiments of the present disclosure provide methods, systems, and computer programs for enabling user to take pictures of monuments, scenes, people, event, etc., that are of optimal composition and quality. It should be appreciated that the present disclosure can be implemented in numerous ways, e.g., a process, an apparatus, a system, a device or a method on a computer readable medium. Several embodiments of the present disclosure are described below.

In one embodiment, a method is disclosed. The method includes the following method operations: detecting an image received on a capturing device; analyzing the image to identify objects and determine attributes of the objects; providing suggestions to adjust at least one of position or setting of the capturing device in accordance to rules, based on the analysis of the image; detecting adjustment of the capturing device based on the suggestions provided, the adjustment used in receiving an adjusted image; and capturing the adjusted image by the capturing device. The saved image is optimal in quality and composition.

In one embodiment, the capturing device is one of a mobile phone equipped with a camera, digital camera, a table personal computer, or a pair of eye glasses equipped with a camera.

In one embodiment, the captured image is rendered on a screen of the capturing device and stored in a cache buffer.

In one embodiment, the objects identified in the image include at least one of animate or inanimate objects including background, people, buildings, birds, animals, scenes, or combinations thereof.

In one embodiment, the rules identify commands for adjusting the capturing device during capturing of the image.

In one embodiment, the commands include one of move up, move down, move left, move right, zoom in, zoom out, adjust angle, use flash light, adjust position of the capturing device, or any combinations thereof.

In one embodiment, the saving includes committing the image to memory within the capturing device.

In one embodiment, analyzing includes computing a composition score based on the attributes of the objects captured in the image. The composition score defines quality of the image captured by the capturing device. The composition score is rendered on a screen of the capturing device.

In one embodiment, detecting adjustment includes dynamically adjusting the computed composition score of the image to account for the adjustment. The adjust composition score rendered on a screen of the capturing device.

In one embodiment, the suggestions are provided as a text, an image, through audio, or any combinations thereof.

In one embodiment, a device is disclosed. The device includes a camera for receiving and capturing image and a display screen for rendering the image. The capturing device includes an image analyzer application to process the received image, a memory to store the image analyzer application and the captured image, a processor for executing programming instructions of the image analyzer application stored in the memory, a cache memory to temporarily store the received image during analysis of the image before committing the image to memory. The programming instructions of the image analyzer module is configured to, receive the image on the capturing device; analyze the received image to identify objects and attributes of the objects; provide suggestions to adjust at least one of position or setting of the capturing device according to rules, based on the analysis; detect adjustments to the capturing device based on the suggestions provided, the adjustment used in receiving an adjusted image; and capturing and storing the adjusted image by the capturing device.

In another embodiment, a method is disclosed. The method includes detecting an image received on a capturing device. The image is analyzed to identify objects and determine attributes of the objects. Based on the analysis of the image, suggestions are provided to adjust a position or setting of the capturing device in accordance to rules. The image received after the adjustments are made is saved in the capturing device.

In yet another embodiment, a device is disclosed. The device includes a display screen, an analyzer module to receive an image to cache of the device, and a processor for detecting objects in the image. The analyzer module is configured to identify attributes of the detected objects. The processor is configured to generate at least one suggestion that is presented on the display screen. The suggestion is to make an adjustment to one of a position of the device or a setting of the device. The suggestion is generated based on analysis of one or more rules that are processed for the identified attributes of the detected objects. The processor generates instructions to capture and save the image to memory once the adjustment is detected.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

FIG. 5 illustrates a basic infrastructure of a computing device used in processing data obtained from a plurality of users in a social network, in one embodiment of the invention.

DETAILED DESCRIPTION

The following embodiments describe methods, computer programs, and systems for providing composition and position guidance in a capturing device equipped with a camera. The capturing device may be a digital camera, a mobile device, such as a tablet personal computer (PC), a mobile phone, an augmented reality system, or any other camera equipped devices. The augmented reality system may be in the form of a pair of eye glasses equipped with a camera. The camera portion of the capturing device includes an image analyzer application that is configured to receive an image captured by the camera, analyze the image to identify objects and attributes of the objects, provide suggestions to adjust the camera for capturing the image, and save the image in memory. The suggestions assist in improving quality of the image captured by the camera of the capturing device. The image analyzer application allows even an amateur user of camera to capture quality pictures, allowing the user to enjoy the pictures of the event, monument, scene, etc., enriching the user's experience.

The various suggestions may be provided in different formats, including text format, image overlays, audio format, etc., to guide the user in capturing optimal quality images. In one embodiment, users may be provided with options to select the suggestion format thereby providing greater flexibility to the user for controlling the way the user desires to receive suggestions.

Figure 1:
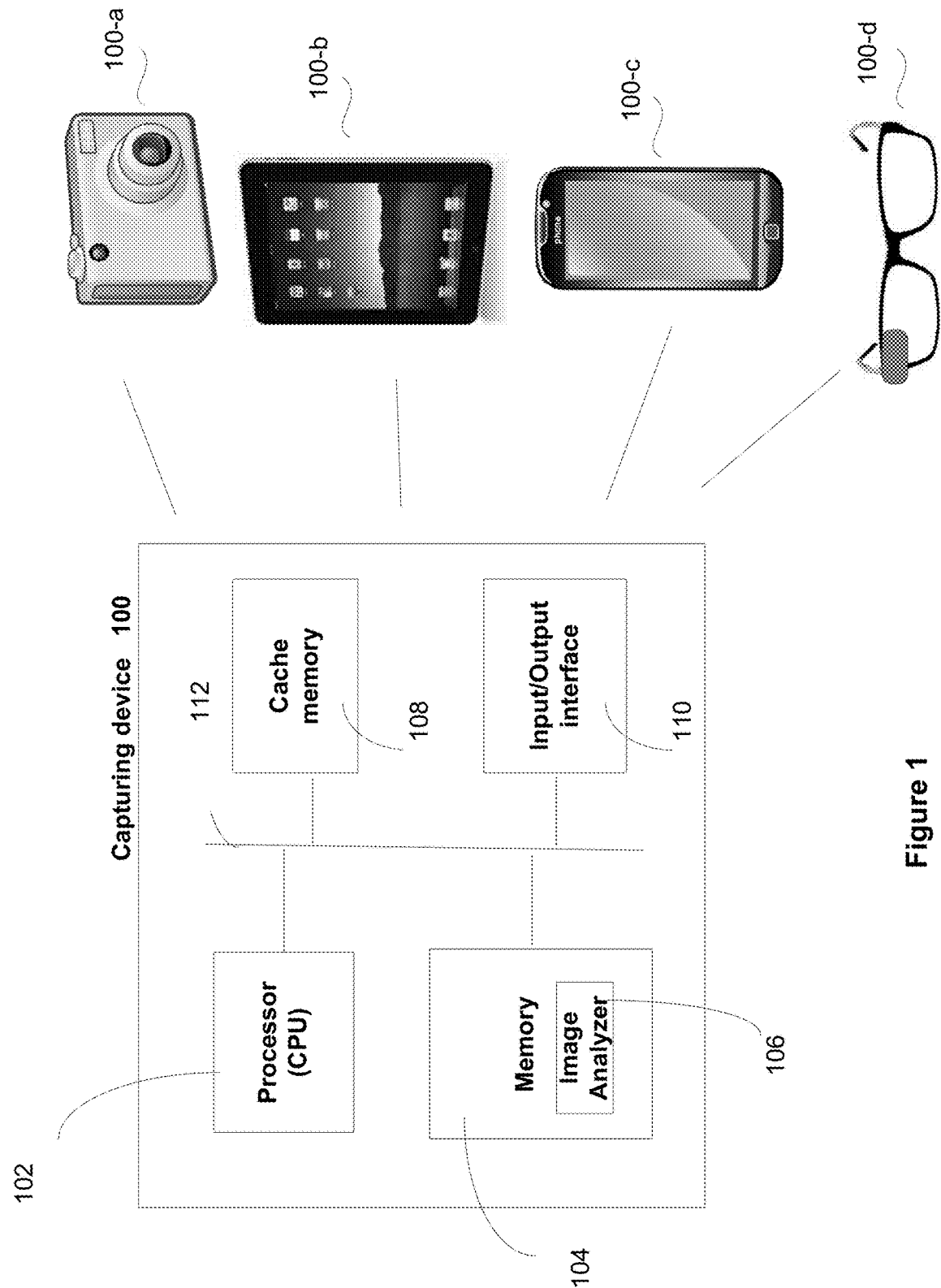
FIG. 1 illustrates an example architecture of a capturing device for implementing embodiments of the disclosure, in accordance with embodiments of the present disclosure.

With the general understanding of an image analyzer application for improving a quality of an image captured by a camera of a capturing device, specific embodiments will be discussed with reference to the various Figures. FIG. 1 illustrates a capturing device that employs an image analyzer application for analyzing data of an image received on a capturing device. The capturing device may be any camera-equipped device, such as a camera (i.e., digital camera) 100-a, a tablet personal computer (PC) 100-b, a mobile phone 100-c, an augmented reality system 100-d, such as a pair of eyeglasses equipped with a camera, etc. The capturing device includes a processor 102 coupled through a bus 112 to a memory 104, a cache memory 108, an input/output interface 110. The memory 104 is used to store process instructions for image analyzer application 106, images captured by the capturing device, and one or more pre-defined rules used by the image analyzer application 106 to provide suggestions for improving quality of images captured by the capturing device. The processor 102 is used to execute process instructions stored in memory, including process instructions defined in the image analyzer application 106. The cache memory 108 is used as temporary storage for data that is currently being processed by the processor 102, frequently used data, and data that has not yet been committed to memory. The input/output interface 110 is used to capture user interactions, provide the user interactions as input to the image analyzer application and to provide responses from the image analyzer application to a display device of the capturing device.

Figure 2:
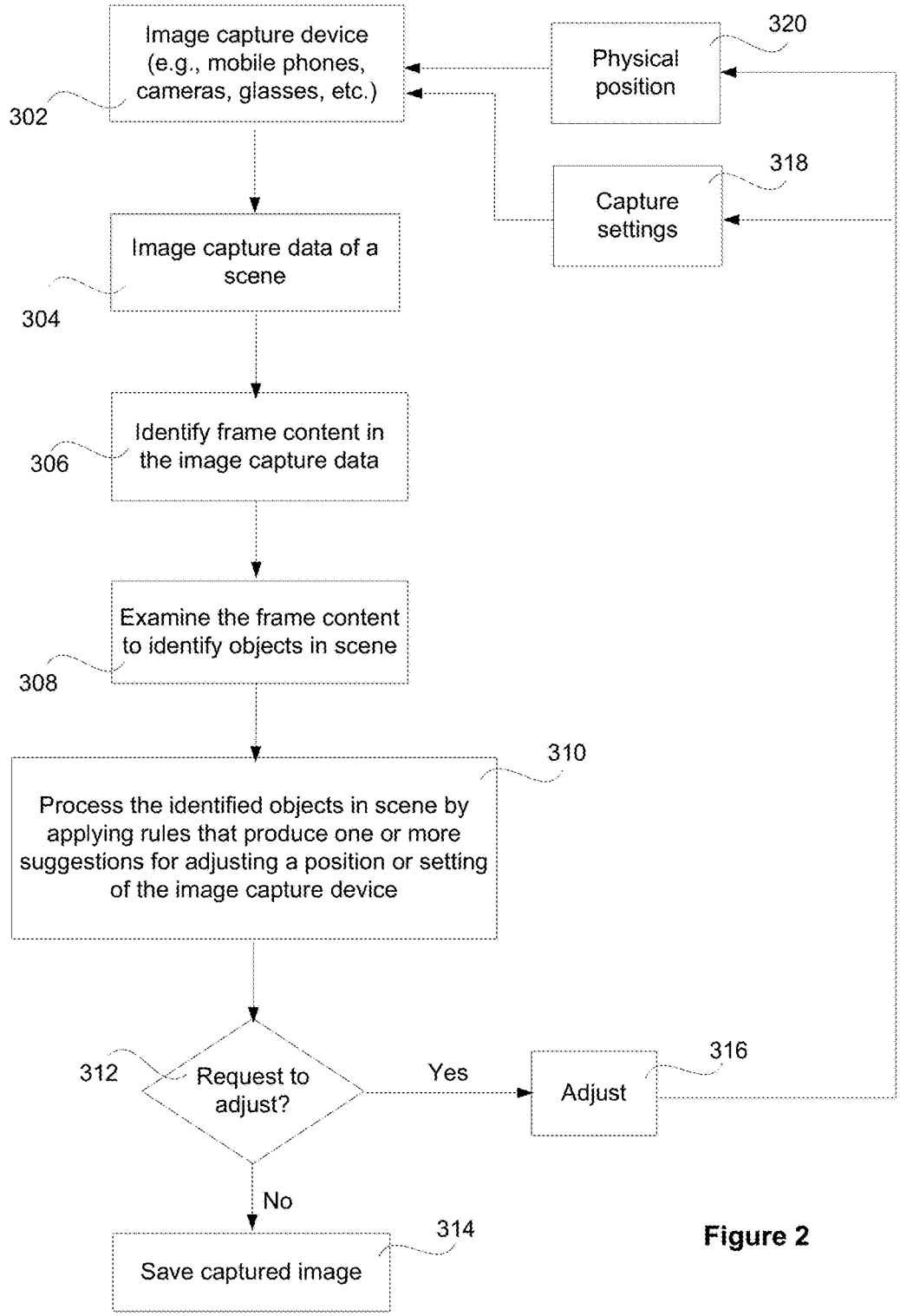
FIG. 2 illustrates exemplary method operations used for adjusting a captured image, in accordance with an embodiment of the invention.

The role of the image analyzer application in providing suggestions to improve quality of image received on a display screen of the capturing device, will now be described with reference to FIG. 2. A camera application is activated on the capturing device through user selection, as illustrated in step 302. In response to user selection of the camera application, a sensor within the camera application identifies the image that the camera is focusing on, renders the image on a display screen of the capturing device, stores the image data in cache memory, as illustrated in step 304, and sends a signal to the image analyzer application for further processing of the image.

The image analyzer application 106 detects the image received on the capturing device and processes the image data stored in cache memory, in response to the signal received from the sensor. The image analyzer analyzes the image data stored in the cache buffer to identify frame content, as illustrated in step 306. The frame content is examined to identify objects in the captured image, as illustrated in step 308. During the analysis, the image analyzer may examine content of each frame of image data stored in the cache memory, outline different portions in the frame and identify the objects captured therein. The objects identified may include animate objects, such as people, birds, animals, etc., and/or inanimate objects, such as buildings, mountains, rivers, background scenes, etc. Upon detecting the objects, the image analyzer application processes the identified objects by applying rules, as illustrated in step 310. The image analyzer may analyze each of the identified objects to determine attributes of the respective object. The image analyzer, for example, may analyze the image to identify the various objects, the orientation of each object in the scene as well as the relative orientation of the objects with each other. The attributes that may be identified by the analysis may include horizontal and vertical aspects, sharpness-factor of the various objects, size of the objects, etc. In some embodiments, the attributes may also include three-dimensional attribute, such as depth of the object. The attributes of the various objects are used to determine overall composition of the image and to provide suggestions for improving the quality of the image that is being captured, as illustrated in step 310.

In one embodiment, the horizontal and vertical attributes of an object are used to determine an angle of capture and to offer suggestions to adjust the angle of the capturing device to improve the quality of the image, based on rules. The horizontal and vertical attributes of an object may be determined by comparing the horizontal and vertical aspects of the object against a defined normal angle defined in the image analyzer application in order to determine if the camera is tilted at an angle. In one embodiment, the relative horizontal and vertical attributes may be computed by comparing the horizontal and vertical aspects of one object against the horizontal and vertical aspects of another object within the image to determine if a particular object is skewed or if the capturing device is tilted at a particular angle and the angle of capture needs to be adjusted. Based on the determination, suggestions may be provided to adjust the angle of the capturing device. The suggestions may follow one or more pre-defined rules. For example, if the horizontal and vertical attributes of all the objects in the captured image indicate that the capturing device is tilted, the pre-defined rules may be defined to offer a suggestion for adjusting the angle of the capturing device. In another example, when it is determined that all the objects in the image are not only skewed/distorted but is distorted by more than a pre-defined threshold value, such as 10°, the rules may identify a suggestion to correct the angle of the capturing device. The rules identify commands requesting user action to adjust the capturing device when capturing the image. The commands are presented as suggestions. In one embodiment, the suggestions are presented in text format. Alternately, the suggestions may be provided in audio format, image format, etc. Some of the commands/suggestions may be directed toward adjusting the camera in order to de-skew/straighten, turn the camera in a particular direction, turn on/off certain features of the camera, etc.

Similarly, the size of the objects in the image may be examined to suggest adjusting of the zoom feature of the camera within the capturing device to zoom in or out in order to obtain an optimal image. In one embodiment, a single image may be analyzed to generate a three-dimensional model of the captured image. In another embodiment, more than one image may be examined to provide the suggestion. In this embodiment, the multiple images may be examined to determine a shift in camera position between the different captured images and a three-dimensional (3D) model may be generated identifying depth, vertical attribute, horizontal attribute, etc., of the objects captured in the images. Based on the various attributes of the objects identified from the 3D model, appropriate suggestions for adjusting the capturing device may be provided. The suggestions may be related to adjusting position or setting of the image capturing device. The suggestions may be provided in accordance to a set of pre-defined rules. The pre-defined rules may include different scenarios of image capture and provide suggestions for capturing optimal image. Based on the analysis and the provided suggestions, the image analyzer module determines if the received image needs to be adjusted or not, as illustrated in the decision step 312. When it is determined that the received image does not need to be adjusted or if the user captures the image without performing any adjustment to the setting or position of the camera by ignoring the suggestions, as illustrated by the "No" branch from the decision point 312, the image is captured and saved in memory, as illustrated in step 314. When it is determined that the received image is to be adjusted, as illustrated by the "Yes" branch in step 316, the process flows to step 318 where adjustments to the capture settings of the capturing device are detected or to step 320 where adjustments to the physical position of the capturing device is detected. At this time, the original image received and stored in the cache memory is discarded. The adjusted settings from steps 318 and/or 320 are used to capture and re-load the image. The re-loading dynamically adjusts the image rendered at the display screen of the capturing device, based on the adjusted settings and/or physical position and the process flows back to operation 302 where the adjusted image is received at the capturing device and is analyzed. The process continues till it is determined that no more adjustment is needed, as illustrated by the "No" branch in the decision step 312. At this time, the user is allowed to capture the image and the captured image is saved in memory, as illustrated in step 314. The resulting image is optimal in quality and composition, when the user follows the suggestions.

Figure 3:
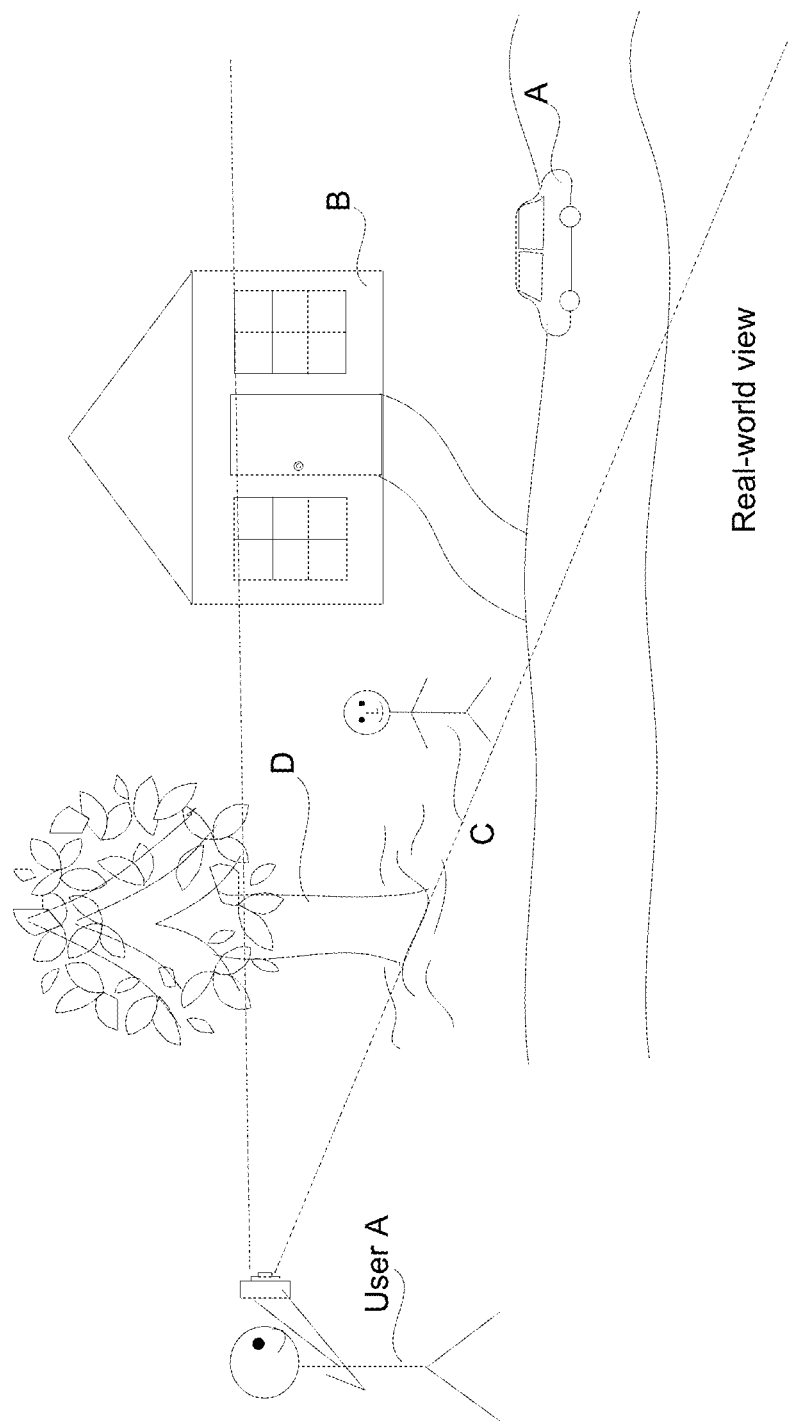
FIG. 3 illustrates an exemplary image of a real-world view captured by a capturing device, in accordance to an embodiment of the invention.

FIGS. 3, 3A-3E illustrate the various attributes identified by the image analyzer application and the suggestions offered by the image analyzer application based on a image captured at the capturing device. User A activates a camera application in his capturing device and focuses the camera on a real-world scene/view that is of interest to the user. FIG. 3 illustrates an image of an exemplary real-world view that the user, User A, has captured with his camera. The real-world view may include a plurality of objects. The real-world view depicted in FIG. 3 is exemplary and should not be considered restrictive or limiting.

Figure 3A:
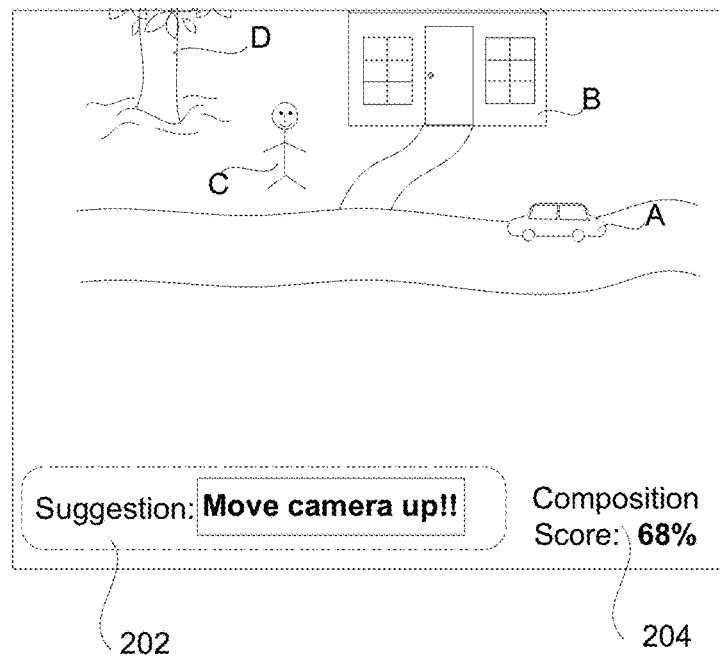
FIGS. 3A-3D illustrate exemplary views of the real-world view image captured by the capturing device and different suggestions offered by an image analyzer application, in accordance with different embodiments of the invention.

The real-world view image as viewed through the camera of user A is rendered at a display screen of the receiving device. FIG. 3A illustrates a screen rendition of the image as received at a capturing device of a user, User A, based on the view angle of the camera in the capturing device. It should be noted that at this time, the user A has merely pointed his camera at the real-world view and has not captured the image, yet. As a result, the image received at the display screen is stored in a temporary memory, such as the cache memory, within the capturing device to allow further processing by the image analyzer application. When an image is captured, the image is committed to memory within the capturing device. The image analyzer application analyzes the image data within the cache memory, identifies the frame content of the received image data depicted in the FIG. 3A, examines the frame content to identify the objects of the real-world scene (objects A, B, C and D) received in the image. As a result, the image analyzer application identifies a car (object A), a house (object B), a person (object C) and a tree (object D) based on the examination of the image data in the cache memory. The examination may also include identifying vertical and horizontal aspects of each and every object, as well as other attributes, such as angle of capture, size, etc. In this embodiment, the image analyzer application identifies 2D aspects of the objects captured in the image. Based on the analysis, the image analyzer application may offer suggestions to improve the composition of the image based on certain predefined rules. For example, if some of the objects in the image are incomplete, the rule may suggest adjusting the position of the camera. In one embodiment, the rules are provided as commands that a user needs to follow in order to obtain an optimal image.

The command may be provided in the form of a suggestion. As illustrated in FIG. 3A, the suggestion 202 may be provided in textual format and may be overlaid on the image in a portion of the display screen. The suggestion in FIG. 3A requests the user A to move the camera up to capture the full image of object B (i.e., the house). In addition to providing suggestions, the image analyzer algorithm may also compute a composite score and render the same at the display screen. The composite score identifies the quality of the image rendered on the display screen and may be computed in accordance to the pre-defined rules based on the examination of the attributes of the objects within the received image.

Figure 3B:
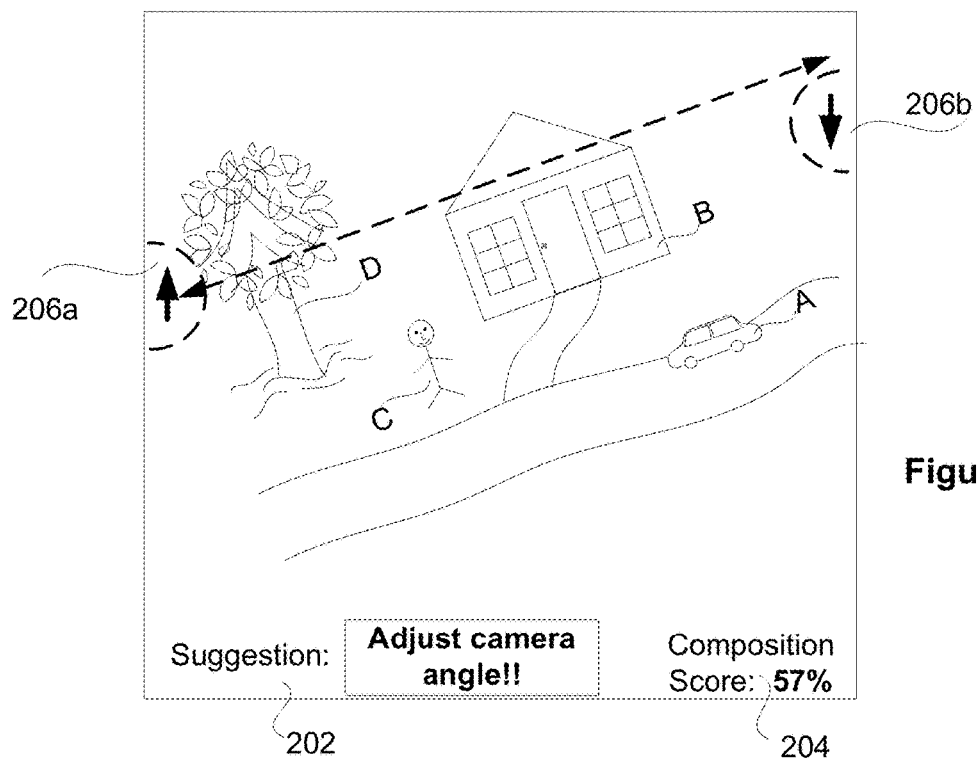

FIG. 3B illustrates an alternate suggestion that may be provided at the display screen. Based on the command/suggestion provided in FIG. 3A, user A may have adjusted the camera position to capture the full image of object B. However, during the capture, the user may have tilted the camera. As a result, the image rendered in the display screen would be tilted. Based on the newly received image depicted in FIG. 3B, the image analyzer application may provide a suggestion to adjust the angle of the camera, as depicted in the suggestion box 202 of FIG. 3B. The image analyzer application dynamically adjusts the composition score of the newly received image to account for the adjustment in the position or setting of the camera, as illustrated in box 204 of FIG. 3B. The suggestions provided by the image analyzer application is in the form of textual content, as illustrated in box 202. The suggestion may also be, in one embodiment, in the form of image content, as illustrated by image 206a and 206b. In this embodiment, the suggestion image is in the form of static image. The suggestions are not restricted to static image but may include dynamic or animated image with visual cues to adjust the position or setting of the camera. The suggestion, in other embodiments, may include audio commands. It should be noted that the various formats used for providing suggestions are exemplary and should not be considered restrictive. Other formats may be used so long as it allows the user to follow the suggested directions.

Figure 3C:
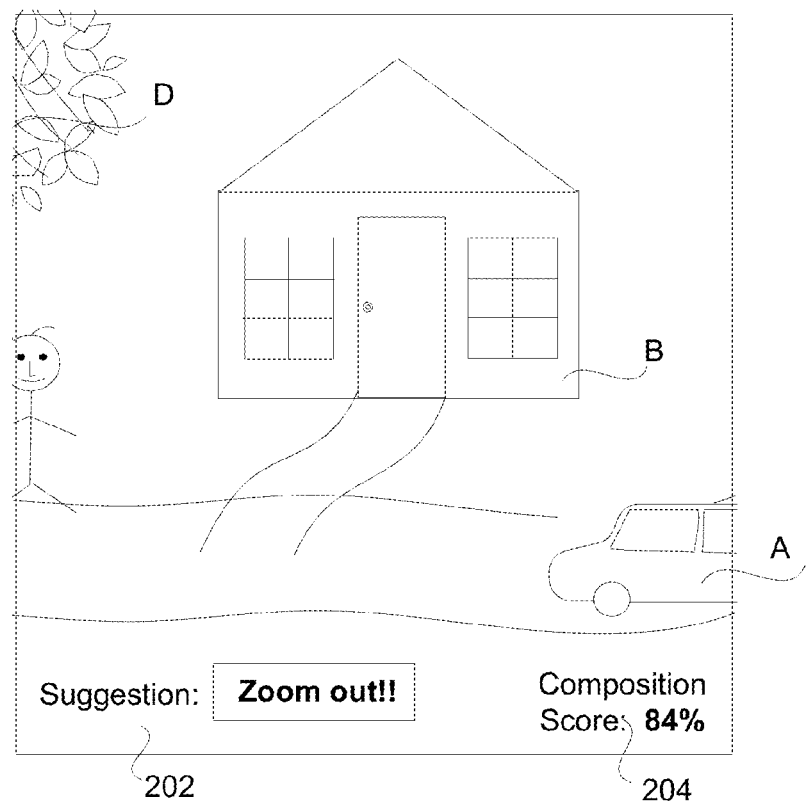
Figure 3D:
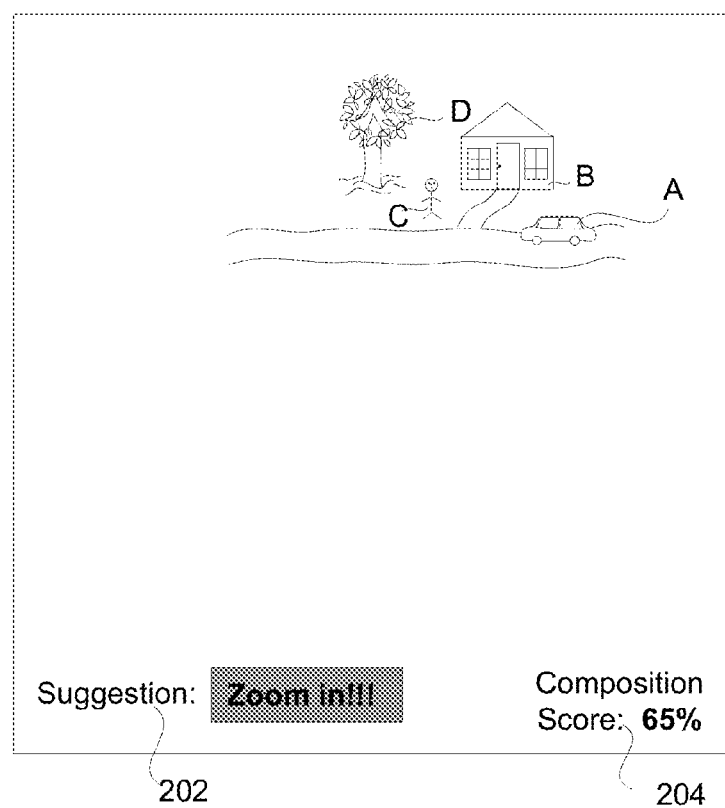

FIG. 3C illustrates adjusted image where the image has been zoomed in too much and the objects are too big and some of the objects are only partially visible (objects A, C & D), in one embodiment. As a result, the suggestion is provided to use the zoom out feature in the camera so that the image can be captured optimally. The composition score, in this embodiment, is higher as the quality of the objects captured in the image are good but can be adjusted to get a better view. FIG. 3D illustrates another embodiment, where the image is too small. As a result, the suggestion may be to use the zoom in feature so as to allow the objects A-D to be visible in an optimal manner. The composition score is adjusted based on the quality of the image as determined by the pre-defined rules.

Once the adjustment to the position and/or setting of the camera within the capturing device is made, based on the suggestion, the user may be allowed to capture the image. As the capturing device is ready to capture a new image of the real-world view, the old image is discarded from the cache buffer. The captured image is optimal in composition. The captured image is stored in the memory of the device and can be accessed by the user at any time so long as the image is in the memory.

Figure 3E:
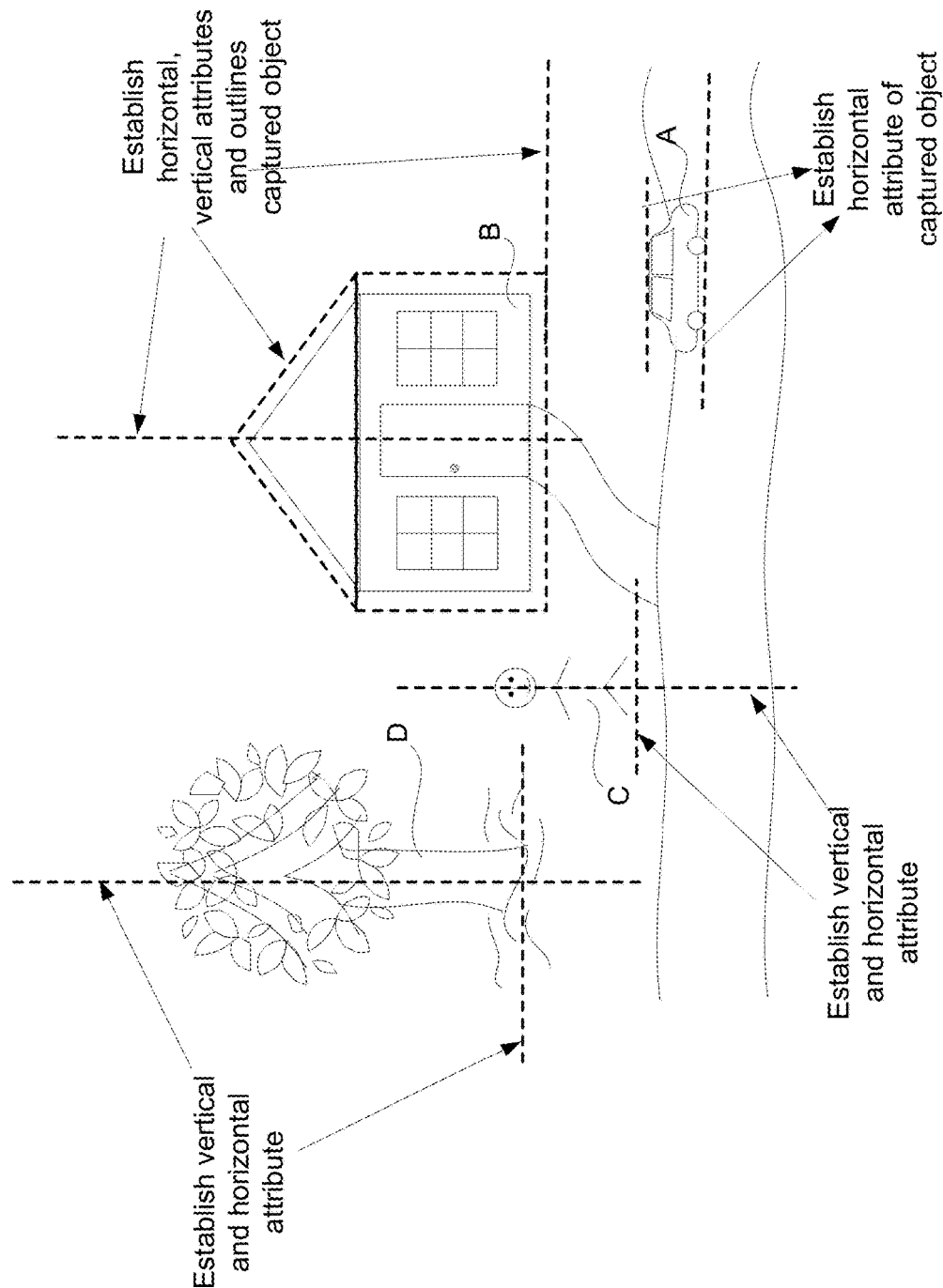
FIG. 3E illustrates exemplary attributes of different objects identified in the captured image during analysis, in one embodiment of the invention.

FIG. 3E illustrates the various 2D aspects of different objects identified by the image analyzer application during examination of the frame content, in one embodiment. As illustrated, the image analyzer application determines an outline of object B, establishes vertical and horizontal attributes of object A, establishes horizontal and vertical attributes of objects C and D. Based on the analysis and examination of the image data, the image analyzer determines that certain aspects of the image are of optimal quality while other aspects of the image are not of optimal quality.

For example, the image analyzer may determine that the angle and size aspects of some of the objects captured in the image is of optimal quality based on the horizontal and vertical attributes of the different objects in the image but determines that some of the objects in the image have been cut-off and are not complete. In some embodiments, during the analysis, the image analyzer may determine the object(s) that are being focused on, in the image, and based on the determination examine the object(s) in the image. For example, if the image includes a person(s) in the foreground with a scene in the background, the image may determine that the primary focus is the person(s) and examine the image with respect to the person(s). Alternately, the image analyzer may determine that the object that the user is primarily focusing on may be a scene, such as building(s), stone formation, gorge, etc., and base the examination on the object of primary focus.

Based on the analysis, the image analyzer application may offer suggestions to improve the composition of the image based on certain predefined rules. For example, if some of the objects in the image are incomplete, the rule may suggest, in the form of commands, adjusting the position of the camera. Some of the commands that may require adjustment to the camera's position may include move up, move down, move left, move right, adjust angle, etc. Some of the commands that may require adjustment to the camera's setting may include zoom in, zoom out, use flash light, adjust color, etc.

Figure 3F:
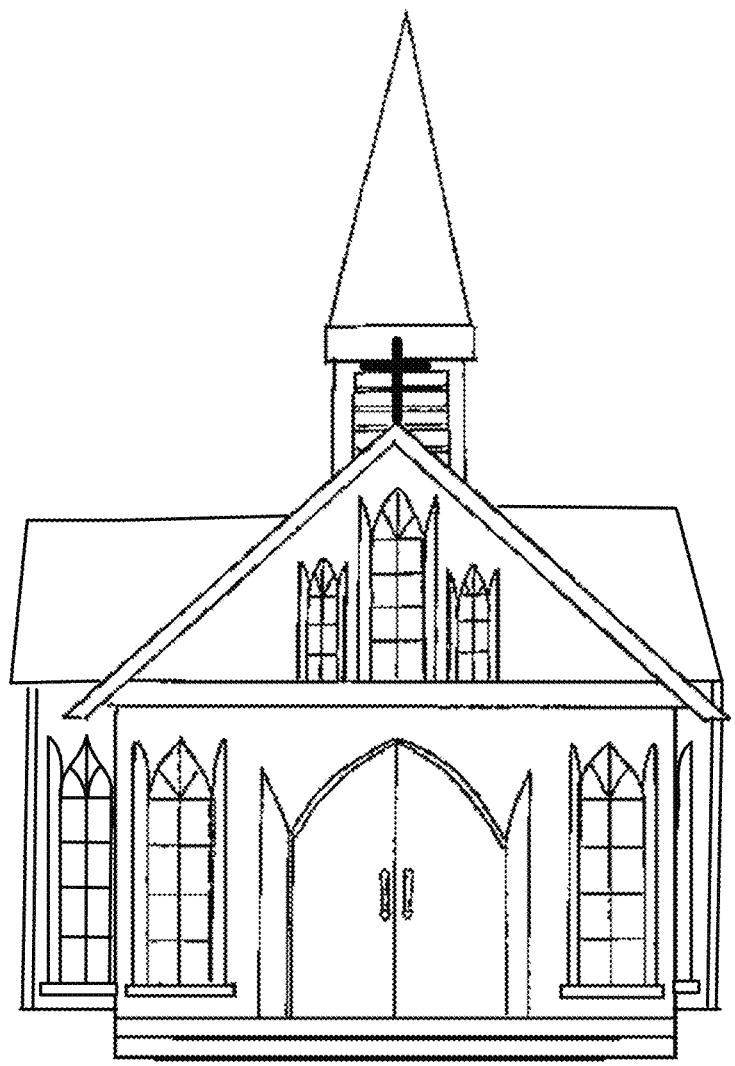
FIGS. 3F and 3G illustrate an embodiment for capturing an exemplary three-dimensional view of a real-world image by a capturing device, in accordance to an embodiment of the invention.
Figure 3G:
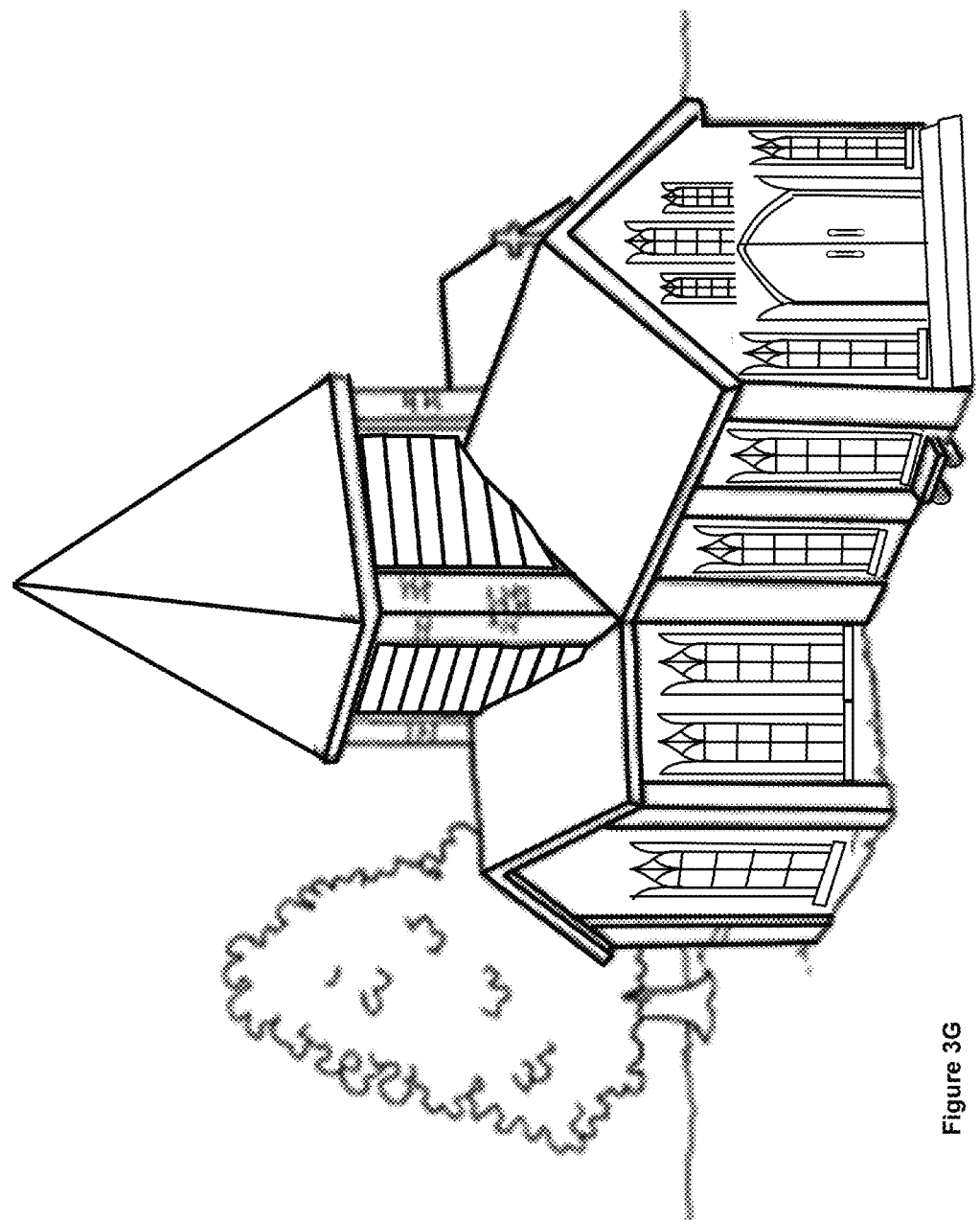

FIGS. 3F and 3G illustrate an alternate embodiment of the invention. In this embodiment, the image analyzer application may examine the image captured by a camera in the capturing device to identify 3D attributes and use the 3D attributes to generate a 3D model of the image. Using the 3D model and the pre-defined rules, suggestions, in the form of commands, may be provided to the user to adjust the camera's position or setting to obtain optimal image. FIG. 3F, for example, illustrates a building, such as a church, as the primary object of focus in the image captured by a user using the camera in a capturing device. The image of the building is examined and a 3D model of the building is generated. From the generated 3D model, the image analyzer application may determine that the depth aspect of the building is not clearly represented in the image captured by the camera. For example, as shown in FIG. 3F, the side extensions of the building (i.e., church) have aligned with the edge of the main portion of the building and are not entirely visible. In order to obtain a 3D image of the building, the image analyzer application may provide suggestions to adjust the camera's position, as shown in suggestion box 202 in FIG. 3F, so as to get a better view of the building that captures the 3D aspect. Additionally, a composite score defining the quality of the image is also computed and rendered on a portion 204 of the screen rendering the image.

FIG. 3G illustrates the resulting image of the building captured in FIG. 3F, when a user follows the suggestion and adjusts the camera of the capturing device. As can be seen in the newly captured image of the building, the depth attribute representing the 3D aspect is now visible. In addition to capturing the 3D aspect, the camera captures other elements, such as a tree, that were previously not visible in the 2D representation captured in FIG. 3F.

In one embodiment, the image analyzer application may obtain information about the object captured in the image, from other sources, such as a map application, a travel application, etc. Using the information gathered from other sources along with the information obtained through the examination of the image captured by the user, the image analyzer application may determine if the primary focus object has been captured to reflect the 3D aspects and if not, offer suggestions for adjusting the position or setting of the camera. In this embodiment, the image analyzer application uses the location of the capturing device to retrieve details of the object that is being captured, from other sources in order to provide suggestions. The other sources may include other users that have captured the object in that location and such information may be obtained from the respective sources archives. In some embodiments, specific one(s) of the images for providing suggestions are identified from the other sources based on the popularity or feedback gathered from other users. The various embodiments described herein enable even an amateur photographer to capture professional quality images, thereby enriching the user's experience.

Figure 4:
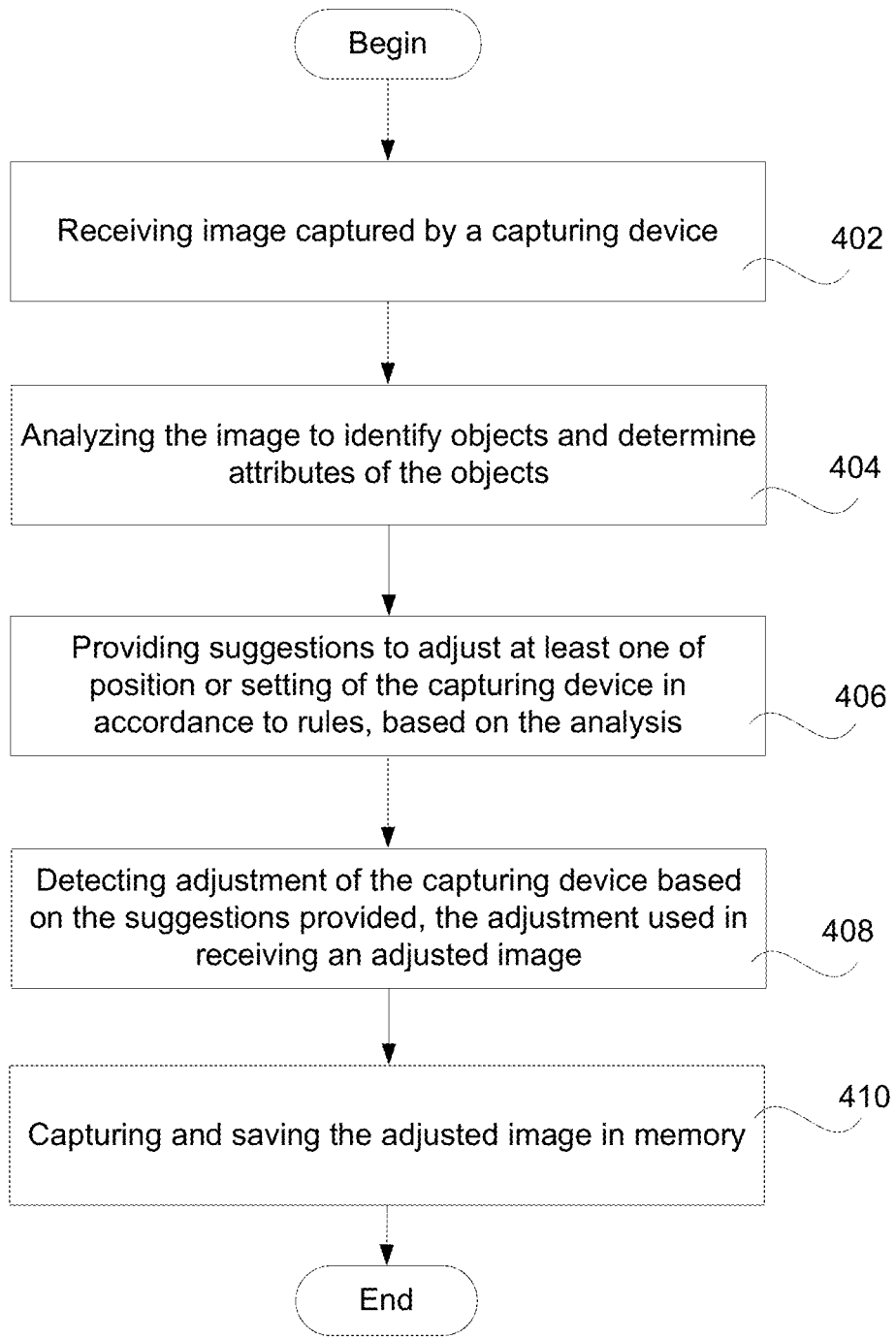
FIG. 4 illustrates exemplary operations of a method used for capturing an optimal quality image, in accordance with an embodiment of the invention.

With the above detailed description of the various embodiments, the method for providing guidance to capture optimal image will now be described with reference to FIG. 4. FIG. 4 illustrates process operations of a method for providing guidance to improve composition and quality of images captured by a camera within a capturing device. The capturing device may include mobile devices, such as mobile phones, table PCs, digital cameras, or augmented reality systems, such as eye-glasses equipped with a camera. The process begins at operation 402 wherein an image is detected at a capturing device. The image may be detected by a sensor within the camera upon activation of the camera application within the mobile device, by a user. The image may be received and rendered on a display screen of the capturing device. The image is stored in a cache memory and a signal is sent to the image analyzer application within the capturing device to determine composition and quality of the received image. It should be noted that the image that is currently being rendered is a result of the camera being directed on one or more objects of interest and has not yet been captured by the camera.

The image analyzer application analyzes the image to identify different objects captured within and determines the attributes of the objects, as illustrated in operation 404. The analyzer application analyzes the image data stored in the cache memory to first identify frame content and examines the frame content to identify the various objects. During the examination, the analyzer application may determine outlines of the objects and identify the attributes of the objects, such as horizontal and vertical attributes of the objects, depth, size of the objects, sharpness factor, etc. The analyzer application uses the attributes of the objects in the image and applies a set of pre-defined rules to determine the composition and quality of the image.

Based on the analysis, the analyzer application provides suggestions to adjust a position and/or setting of the capturing device in accordance to the pre-defined rules, as illustrated in operation 406. The analyzer application may first compute a composition score of the image using the predefined rules and the attributes of the various objects within the received image. The composition score determines the quality and composition of the image. In one embodiment, the analyzer application compares the composition score against a pre-defined quality threshold value.

When the composition score of the image is less than the pre-defined quality threshold value, suggestions may be provided to adjust at least one of a position or a setting of the capturing device. The suggestions may be in the form of text, audio command, image overlays (animated or static), etc., that is presented to the user either on the display screen, through a speaker or through other input mechanism/devices. Alternately, when the composition score of the image is equal to or greater than the quality threshold value, in one embodiment, the image analyzer application may allow the user to capture the image and stores the captured image in the memory of the capturing device.

In response to the suggestions to adjust the position or setting provided by the analyzer application, the user may elect to heed the suggestion or choose to ignore the suggestion. When the user elects to heed the suggestion, the analyzer application may detect adjustment of the capturing device, as illustrated in operation 408. The adjustment of the capturing device may be detected by the one or more sensors in the camera. The adjustment to the position or setting of the capturing device is used in receiving an adjusted image for the image that was originally rendered on a display device of the capturing device. The adjusted image is rendered on the display device. At this time, the original image that was rendered is discarded and the analyzer application begins to examine the adjusted image for quality.

Once the adjusted image is of an acceptable quality, the user is allowed to capture the adjusted image, as illustrated in operation 410. As mentioned earlier, the capturing of the image may be based on the composition score of the adjusted image meeting a pre-defined quality threshold value. As a result, in some embodiments, the analyzer application may have to go through few iterations of adjustment to the position and/or the setting of the capturing device before the adjusted image meets the minimum quality for allowing capture of the image. In response to the image meeting a minimum quality, the analyzer application may provide an informative message that is rendered on the display screen informing the user to proceed with the capturing of the image. The captured image is saved in memory and may be accessed by a user over time. The resulting image is of optimal quality and composition.

The various embodiments solve the problem associated with the capturing of mediocre images. The various embodiments provide a novice or non-experienced user to take quality images of monuments, events, etc. The image that is recorded by the sensor of the camera within the capturing devices is analyzed and suggestions for improving the composition of the image are made by providing indicators, such as horizon leveling indicators, textual overlays, image overlays (such as rectangle/oval/circle overlays), audio commands, etc., to indicate that a better composition can be achieved by adjusting the setting or position of the camera slightly. For a user wearing an augmented reality system (such as pair of eye-glasses with camera), the analyzer application can provide the user with suggestions to move in the scene to get a better image. In the scenario where a user is wearing the augmented reality system, a convenient way of indicating where to move as well as data to compute good positions may be provided by overlaying directions in the user's view and allowing the user to adjust the position or setting of the capturing device. The data to compute good positions (i.e., coordinates) may be computed from three dimensional information generated from the stream of pictures taken by the augmented reality's camera device, making this a more robust solution.

FIG. 5 is a simplified schematic diagram of a computer system for implementing embodiments of the present disclosure. It should be appreciated that the methods described herein may be performed with a digital processing system, which in one embodiment may be a conventional, general-purpose computer system. Special purpose computers, which are designed or programmed to perform only one function, may be used in the alternative. The computing device 502 includes a processor 504, which is coupled through a bus to memory 506, permanent storage 508, and Input/Output (I/O) interface 510.

Permanent storage 508 represents a persistent data storage device, e.g., a hard drive or a USB drive, which may be local or remote. Network interface 512 provides connections via network 514, allowing communications (wired or wireless) with other devices. It should be appreciated that processor 504 may be embodied in a general-purpose processor, a special purpose processor, or a specially programmed logic device. Input/Output (I/O) interface 510 provides communication with different peripherals and is connected with processor 504, memory 506, and permanent storage 508, through the bus. Sample peripherals include display 522, keyboard 518, mouse 520, removable media device 516, etc.

Display 522 is configured to display the user interfaces described herein. Keyboard 518, mouse 520, removable media device 516, and other peripherals are coupled to I/O interface 510 in order to exchange information with processor 504. It should be appreciated that data to and from external devices may be communicated through I/O interface 510. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 508, network attached storage (NAS), read-only memory or random-access memory in memory module 506, Compact Discs (CD), Blu-Ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 514. Network 514 can be, for example, the Internet. The Internet is interconnected with a plurality of devices, including cloud storage servers, cloud logic servers, user interface devices, etc. Some devices that can communicate with the Internet access services on various cloud logic servers and cloud storage can include, e.g., tablet computers, smart phones, laptops, desktop computers, television systems, and the like.

The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware embodiments, and code are configured for enabling the interfacing and interaction with the social network, and the users of the social network, and users on various websites connected to the Internet. The interaction, through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method, comprising:
   detecting, using a processor of a capturing device, an image of a real-world scene, the image received on the capturing device;
   analyzing, using the processor, the image to identify objects in the real-world scene and determine attributes of the objects, the objects comprising animate objects;
   determining, based on the attributes of the objects, whether at least one of position or setting of the capturing device is to be adjusted, wherein determining whether the at least one of position or setting of the capturing device is to be adjusted comprises determining whether the capturing device is tilted at an angle;
   responsive to determining that the at least one of position or setting of the capturing device is to be adjusted, providing, using the processor, suggestions to adjust the at least one of position or setting of the capturing device in accordance to rules, the suggestions comprising a suggestion to adjust the angle of the capturing device;
   detecting, using the processor, adjustment of the capturing device based on the suggestions provided, the adjustment used in receiving an adjusted image of the real-world scene; and
   capturing, using the processor, the adjusted image of the real-world scene by the capturing device.

2. The method of claim 1, wherein the image received on the capturing device is detected by a sensor of the capturing device.

3. The method of claim 1, wherein the capturing device is one of a mobile phone, camera, tablet personal computer, or eye glasses equipped with a camera.

4. The method of claim 1, wherein the received image is rendered on a screen of the capturing device, the received image being stored in cache buffer.

5. The method of claim 1, wherein the objects include at least one of animate or inanimate objects including background, people, buildings, birds, animals, or combinations thereof.

6. The method of claim 1, wherein the rules identify commands for adjusting the capturing device during capturing of the image.

7. The method of claim 6, wherein the commands include one of move up, move down, move right, move left, zoom in, zoom out, adjust angle, use flash light, adjust position of the capturing device or any combinations thereof.

8. The method of claim 1, wherein the capturing causes the image to be saved in memory of the capturing device.

9. The method of claim 1, wherein the analyzing further includes computing a composition score based on the attributes of the objects captured in the image, wherein the composition score defines quality of the image, the computed composition score rendered on a screen of the capturing device.

10. The method of claim 9, wherein the detecting of the adjustment further includes dynamically adjusting the composition score to account for the adjustment in the image, the adjusted composition score rendered on the screen of the capturing device.

11. The method of claim 1, wherein the suggestions are provided as a text, another image, through audio, or any combinations thereof.

12. A non-transitory computer-readable storage medium storing instructions which, when executed by a processing device, cause the processing device to perform operations comprising:
  detecting an image of a real-world scene, the image received on a capturing device;
  analyzing the image to identify objects in the real-world scene and determine attributes of the objects, the objects comprising animate objects;
  determining, based on the attributes of the objects, whether at least one of position or setting of the capturing device is to be adjusted, wherein determining whether the at least one of position or setting of the capturing device is to be adjusted comprises determining whether the capturing device is tilted at an angle;
  responsive to determining that the at least one of position or setting of the capturing device is to be adjusted, providing suggestions to adjust the at least one of position or setting of the capturing device in accordance to rules, the suggestions comprising a suggestion to adjust the angle of the capturing device;
  detecting adjustment of the capturing device based on the suggestions provided, the adjustment used in receiving an adjusted image of the real-world scene; and
  capturing the adjusted image of the real-world scene by the capturing device.

13. The non-transitory computer-readable storage medium of claim 12, wherein the image received on the capturing device is detected by a sensor of the capturing device, and wherein the capturing device is one of a mobile phone, camera, tablet personal computer, or eye glasses equipped with a camera.

14. The non-transitory computer-readable storage medium of claim 12, wherein the objects include at least one of animate or inanimate objects including background, people, buildings, birds, or animals.

15. The non-transitory computer-readable storage medium of claim 12, wherein the rules identify commands for adjusting the capturing device during capturing of the image, and wherein the commands include at least one of move up, move down, move right, move left, zoom in, zoom out, adjust angle, use flash light, or adjust position of the capturing device.

16. The non-transitory computer-readable storage medium of claim 12, wherein the capturing causes the image to be saved in memory of the capturing device.

17. The non-transitory computer-readable storage medium of claim 12, wherein the analyzing further includes computing a composition score based on the attributes of the objects captured in the image, wherein the composition score defines quality of the image, the computed composition score rendered on a screen of the capturing device, and wherein the detecting of the adjustment further includes dynamically adjusting the composition score to account for the adjustment in the image, the adjusted composition score rendered on the screen of the capturing device.

18. The non-transitory computer-readable storage medium of claim 12, wherein the suggestions are provided as at least one of a text, another image, or audio.

19. A system comprising:
  a memory; and
  a processing device, coupled to the memory, to:
  detect an image of a real-world scene, the image received on a capturing device;
  analyze the image to identify objects in the real-world scene and determine attributes of the objects, the objects comprising animate objects;
  determine, based on the attributes of the objects, whether at least one of position or setting of the capturing device is to be adjusted, wherein to determine whether the at least one of position or setting of the capturing device is to be adjusted, the processing device is to determine whether the capturing device is tilted at an angle;
  responsive to determining that the at least one of position or setting of the capturing device is to be adjusted, provide suggestions to adjust the at least one of position or setting of the capturing device in accordance to rules, the suggestions comprising a suggestion to adjust the angle of the capturing device;
  detect adjustment of the capturing device based on the suggestions provided, the adjustment used in receiving an adjusted image of the real-world scene; and
  capture the adjusted image of the real-world scene by the capturing device.

20. The system of claim 19, wherein the objects include at least one of animate or inanimate objects including background, people, buildings, birds, or animals.

* * * * *